United States Patent

[11] 3,591,189

| | | |
|---|---|---|
| [72] | Inventors | James N. Tootle;<br>Glenn S. Beidler, both of Kalamazoo, Mich. |
| [21] | Appl. No. | 805,249 |
| [22] | Filed | Mar. 7, 1969 |
| [45] | Patented | July 6, 1971 |
| [73] | Assignee | Pneumo Dynamics Corporation<br>Cleveland, Ohio |

[54] HIGH TEMPERATURE SEAL
5 Claims, 3 Drawing Figs.

[52] U.S. Cl.......................... 277/117, 277/26
[51] Int. Cl........................... F16j 15/32
[50] Field of Search............... 277/117–122, 205, 206, 26

[56] References Cited
UNITED STATES PATENTS

| 3,018,785 | 1/1962 | Adams, Jr. et al............ | 277/205 |
|---|---|---|---|

FOREIGN PATENTS

| 1,244,391 | 9/1960 | France......................... | 277/205 |
| 772,224 | 4/1957 | Great Britain................ | 277/117 |

Primary Examiner—Laverne D. Geiger
Assistant Examiner—Robert I. Smith
Attorney—Stephen M. Mihaly ABSTRACT: A double lip rod seal in which one lip is curved and tapered, while the other is generally cylindrical, so that the former can experience directed thermal expansion and contraction relative to the surface sealingly engaged by same due to difference in the coefficients of thermal expansion thereof, the lips being spread apart by wedge loading means.

PATENTED JUL 6 1971

3,591,189

INVENTORS
JAMES N. TOOTLE
GLENN S. BEIDLER

BY Stephen M. Mihaly
ATTORNEY

HIGH TEMPERATURE SEAL

This invention relates to a seal of double lip form for sealing concentric annular surfaces.

More particularly, the invention is concerned with the seal on this order disclosed in the copending application of Waldo G. Fruehauf, Ser. No. 527,971, filed Feb. 16, 1966, now U.S. Pat. No. 3,520,542, issued July 14, 1970, and assigned to the assignee of the present application.

The seal of such application comprises an elastomeric ring member having a U-shape cross section and thus inner and outer sealing lip surfaces which are cylindrical. These surfaces are coextensive, over the full length of the member, and two separate spring-loaded wedge rings act on the lips in a manner to spread them apart respectively against the surfaces to be sealed, such as those of a piston rod and a housing for the same. While this seal performs well in many applications, the basically rectangular form of the member was found to be limiting when made of a material having a high coefficient of thermal expansion and used under extreme temperature conditions. For example, when the seal material has a significantly higher coefficient than the housing and the assembly at high temperature, the seal expands against the housing until a permanent set or failure occurs. If the permanent set is produced, the seal shrinks away from the housing and seizes the rod when the temperature is reduced, and failure can also occur as a result of such rod seizure. It will also be appreciated that, conversely, if the seal is caused to operate at a temperature substantially lower than normal, a potential setting force would be acting inwardly against the rod, and, further, that these relationships would be relatively reversed if the seal coefficient of thermal expansion should be significantly lower than that of the rod and housing.

It is, therefore, a principal object of the present invention to improve the range of temperature over which such double lip seal can be operated without impairment or failure, and a more particular object is to provide this improvement as a result only of changing the form of the sealing member in the full seal assembly.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 1:
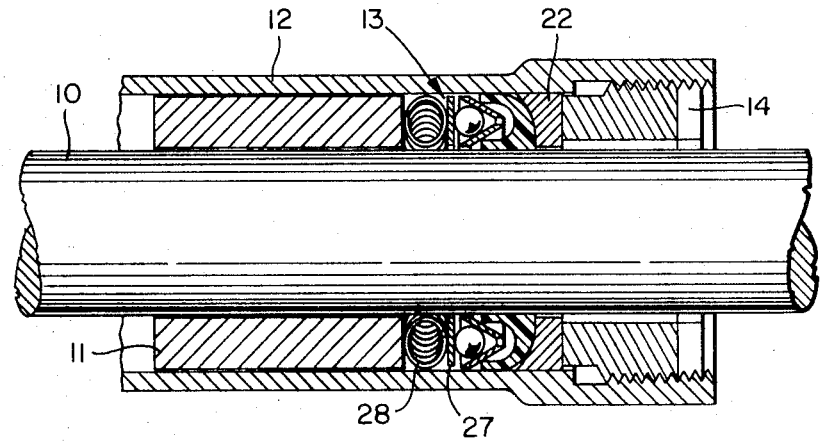
FIG. 1 is a fragmented longitudinal section of a rod and housing assembly incorporating a seal in accordance with the present invention.
Figure 2:
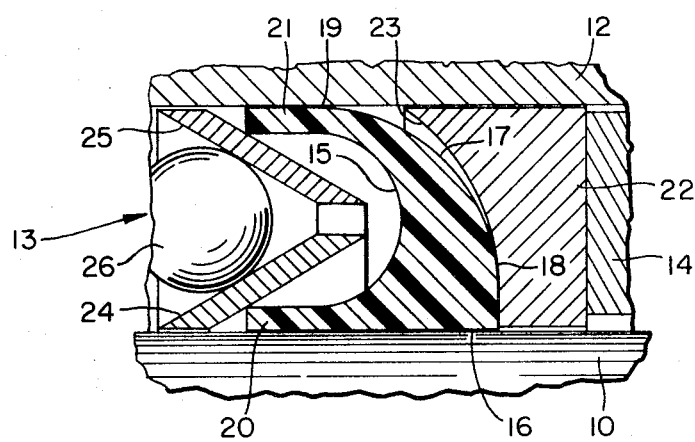
FIG. 2 is a comparable section but showing only a portion of the assembly on an enlarged scale.

Referring now to the drawing in detail, the illustrated assembly comprises a rod or shaft 10 supported by a bushing 11 in a housing 12 for relative reciprocation or rotation. The new seal, designated generally by reference numeral 13 is interposed between the bushing and a gland nut 14 threaded into the end of the housing.

The seal includes a continuous resiliently deformable ring member having a centered lip-defining groove or recess 15 at one end the wall of which is of regular U-shape in the section of the body. The outer sectional shape, however, is a modified U and, more particularly, defines an interior cylindrical surface 16 of the member and an outer surface which has a radius section 17 extending convexly from a point 18 inwardly of the centerline of the section, and thus a relatively short distance from the end of the inner cylindrical surface, to a point 19 relatively close to the opposite end of the member.

While the inner lip 20 of the member thus engages the rod over the full length of the seal, the outer lip 21 is generally curved and tapered and in engagement with the housing only over the relatively short cylindrical section between the point 19 and the adjacent end of the member. A backup ring 22 is disposed between the closed radiused end of the member and the gland nut, and the end of the backup ring against the member is also generally correspondingly curved, but at a larger radius, as shown, to provide clearance 23 between the two.

The outer sealing lip can accordingly deflect and effectively extend itself axially when the material expands relatively against the housing, without any set occurring and the material shrinking to the normal size when the temperature is reduced. The clearance at the face of the backup ring will be seen to accommodate such thermal growth, while providing structural backing for the seal at high pressures.

The seal further includes, as in the noted Fruehauf application, inner and outer wedge rings 24 and 25 of frustoconical shape respectively against the sealing lips and entering the recess 15. Steel balls 26 are disposed freely in the outwardly converging space between the two wedge rings, and a flat backup ring 27 serves to retain the balls cooperably with a close wound coil spring garter 28 between the ring 27 and the end of the bushing 11. The spring garter, and it will be understood that other spring forms for comparable wedge loading might be substituted, provides a desired preload in the seal, with the lips being wedged apart respectively into the desired sealing relation with the rod and housing. Since the two wedge rings are free to move relatively, the inner ring can advance on the inner lip for automatic wear compensation independently of the outer ring, without loss of backing or load in the assembly.

Figure 3:
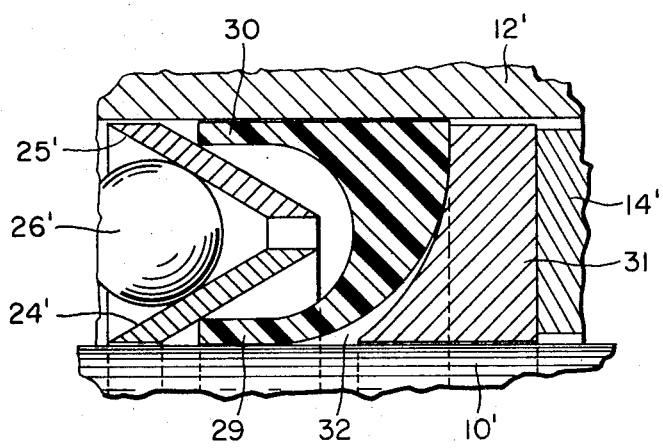
FIG. 3 is a section similar to FIG. 2 showing a modified form of the seal.

The embodiment of the new seal described above is of course the one which would be used when operation would result in differential expansion tending to force the elastomeric member outwardly against the housing. When the difference in the respective coefficients under the given temperature change is such to cause relative contraction of the seal ring, the latter should be formed as shown in Figure 3, with inner lip 29 curved and tapered and outer lip 30 having the cylindrical sealing surface. Backup ring 31 is also relatively reversed to provide the general conformance to the curved lip and clearance 32 for the same.

The above-disclosed preferred embodiment of the new seal thus retains the basic design of the seal disclosed in the noted Fruehauf application, which provides in particular high-pressure operation with improved wear compensation, while substantially expanding the temperature capability of the same.

Other modes of applying the principle of the invention may be employed, change being made as regards the details described, provided the features stated in any of the following claims or the equivalent of such be employed.

We, therefore, particularly point out and distinctly claim as our invention:

1. A high temperature seal comprising a ring form resiliently deformable member having radially spaced-apart inner and outer sealing lip sections which are generally cylindrical and concentric for engagement with corresponding annular surfaces to be sealed, the section of the member intermediate said generally cylindrical sections having an exterior surface which forms a curved continuation of the sealing surface of one of the lips, and backup means for supporting the member at the closed side thereof between the annular surfaces to be sealed, with that portion of said backup means opposed to the curved exterior surface of the member being curved at a larger radius to provide a tapered clearance therebetween, whereby the member is free to expand thermally along such clearance relative to the surfaces being sealed.

2. A seal as set forth in claim 1, wherein the intermediate section of the member decreases in thickness outwardly to the contiguous generally cylindrical sealing lip section.

3. A seal as set forth in claim 2, wherein the interior surface of the member at the open side thereof is of U-shape.

4. A seal as set forth in claim 3, wherein the exteriorly curved intermediate section extends over more than half of the radial width of the member.

5. A seal as set forth in claim 1, further comprising wedge means for independently loading the inner and outer sealing lip sections.